US006786515B2

United States Patent
Franko, Sr.

(10) Patent No.: US 6,786,515 B2
(45) Date of Patent: Sep. 7, 2004

(54) TUBE CONTAINER WITH AN INTEGRAL PANEL FOR CARRYING A LABEL

(75) Inventor: Joseph D. Franko, Sr., Ham Lake, MN (US)

(73) Assignee: Quality Assured Enterprises, Inc., Minnetonka, MN (US)

( * ) Notice: Subject to any disclaimer, the term of this patent is extended or adjusted under 35 U.S.C. 154(b) by 0 days.

(21) Appl. No.: 10/356,061

(22) Filed: Jan. 31, 2003

(65) Prior Publication Data

US 2003/0146617 A1 Aug. 7, 2003

Related U.S. Application Data

(63) Continuation-in-part of application No. 10/005,757, filed on Nov. 2, 2001.

(51) Int. Cl.[7] .............................................. B42D 15/00
(52) U.S. Cl. .............................. 283/81; 40/306; 40/630; 206/459.5; 206/484; 283/98; 283/101; 428/40.1; 428/42.1
(58) Field of Search .............................. 283/81, 94, 98, 283/101, 106; 428/40.1, 41.7, 41.8, 42.1, 42.2, 42.3, 306; 40/630, 638; 206/459.5, 469, 484

(56) References Cited

U.S. PATENT DOCUMENTS

| 4,645,486 | A | * | 2/1987 | Beal et al. ................. 604/4.01 |
| 4,849,043 | A | | 7/1989 | Instance |
| 5,048,711 | A | * | 9/1991 | Weiss et al. ................. 220/214 |
| 5,131,553 | A | * | 7/1992 | Geasland ..................... 220/235 |
| 5,264,265 | A | | 11/1993 | Kaufmann |
| 5,373,966 | A | * | 12/1994 | O'Reilly et al. .............. 222/94 |
| 5,672,224 | A | * | 9/1997 | Kaufmann ................... 156/257 |
| 5,967,560 | A | | 10/1999 | Seidl |
| 6,129,959 | A | | 10/2000 | Mercer et al. |
| 6,162,158 | A | | 12/2000 | Mercer et al. |
| 6,308,827 | B1 | * | 10/2001 | Hacikyan ..................... 206/204 |
| 6,332,631 | B1 | * | 12/2001 | Kirk ............................ 283/81 |
| 6,547,094 | B1 | * | 4/2003 | Jacobs ......................... 220/839 |

FOREIGN PATENT DOCUMENTS

JP  2000226044  * 8/2000

* cited by examiner

Primary Examiner—Monica S. Carter
(74) Attorney, Agent, or Firm—Walter K. Roloff

(57) ABSTRACT

A tube container with an integral panel for carrying a label includes a tube container having a product dispensing end, an intermediate sealing portion, and a filling end opposite the product dispensing end. The sealing portion is capable of being sealed subsequent to filling the tube container with a selected product. A label panel is provided in proximity to the sealing portion, with the label panel being integrally formed from material forming the tube container between the sealing portion and the filling end. An expanded content label may then be secured to the label panel.

14 Claims, 8 Drawing Sheets

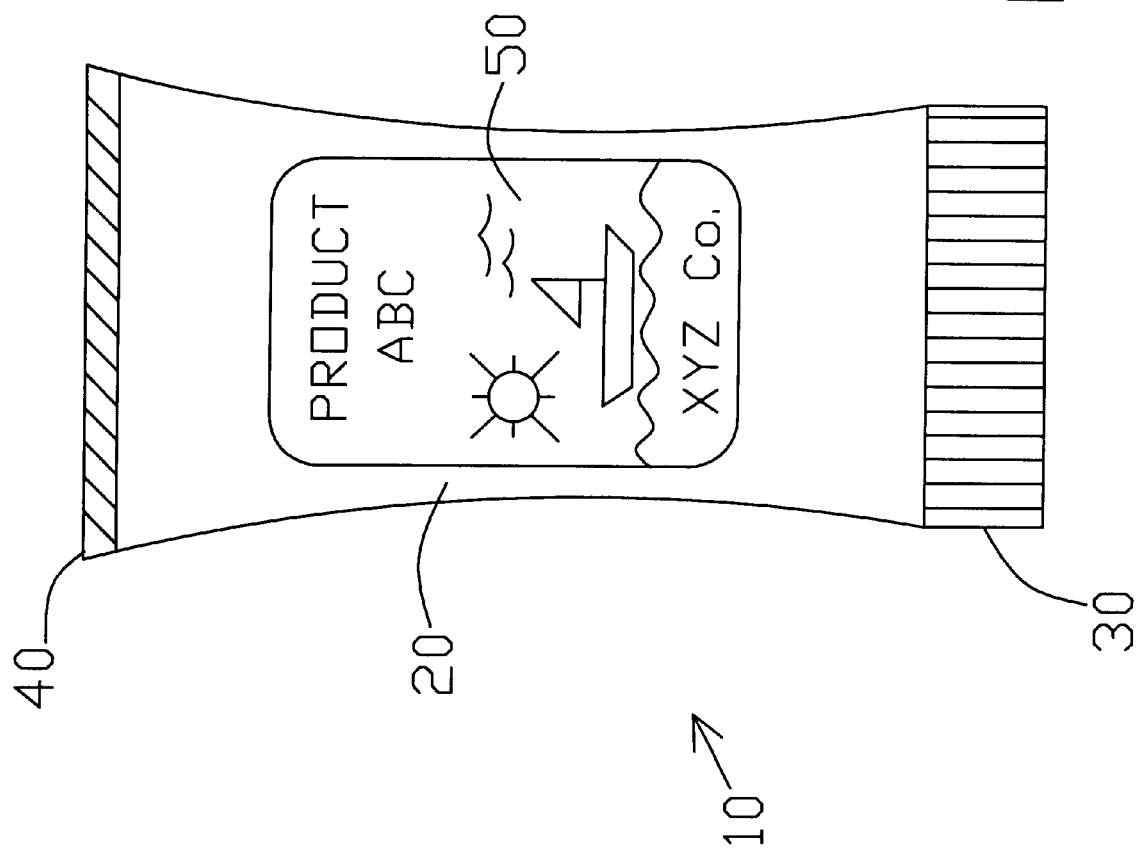

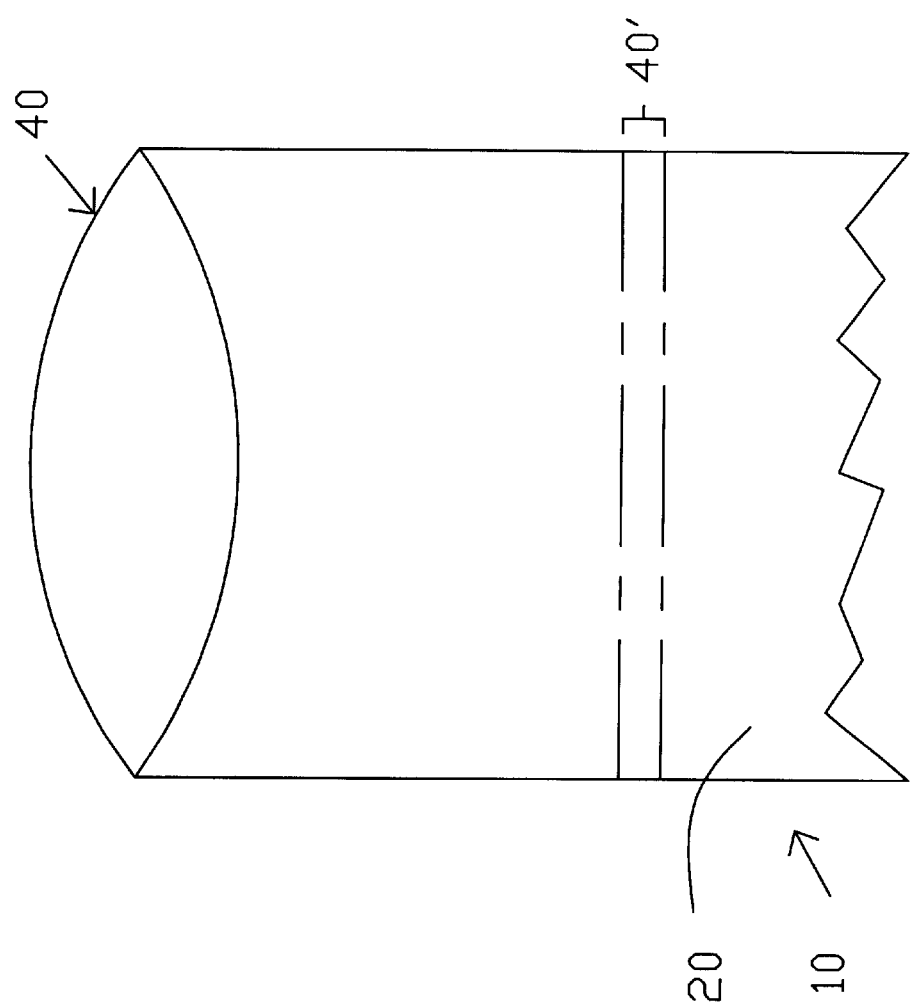

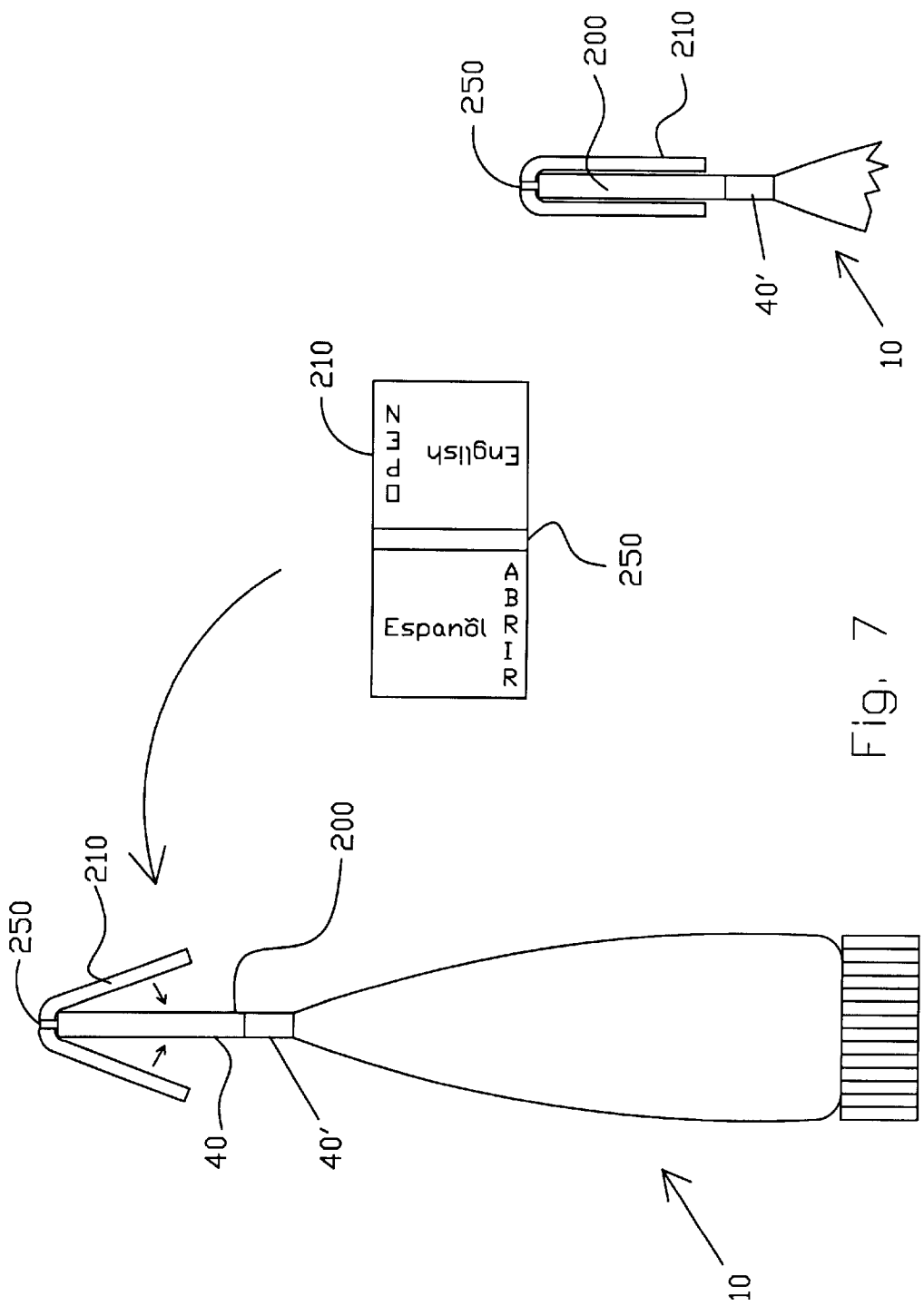

TUBE CONTAINER WITH AN INTEGRAL PANEL FOR CARRYING A LABEL

CROSS-REFERENCE TO RELATED APPLICATION

The present application is a continuation-in-part of U.S. patent application Ser. No. 10/005,757 filed Nov. 2, 2001, the disclosure of which is specifically incorporated herein by reference thereto.

FIELD OF THE INVENTION

The present invention relates generally to tube containers. The invention relates specifically to a tube container with an integral panel for carrying a label.

BACKGROUND OF THE INVENTION

In the printing arts, and in particular in the commercial printed label art for labeling and decorating consumer products, there exists a continual demand for labels and decorations which not only appeal to consumers, but also bear ever increasing amounts of printed information. For example, labels for identification of consumer health care and pharmaceutical products are often required by governmental regulations to describe in painstaking detail their compositions and ingredients. As new food and drug laws are passed, regulations require the inclusion of increasing amounts of label information. Manufacturers of consumer products and their packaging vendors have devised various techniques for inclusion of such extensive information. Among these are simply printing the information in small type on a product container box or carton, or including an information insert sheet within the box or carton. Obvious drawbacks to these techniques include increased packaging costs and post-consumer packaging waste associated with a box or carton, and the fact that boxes, cartons, and insert sheets often go unnoticed and are promptly discarded by a consumer. This is particularly problematic relative to elderly consumers, or for those consumers for whom English (or the language of the manufacturer) is a second language.

In general in the labeling and packaging arts, various forms of "expanded content" labels have been proposed to provide increased printed information. As used herein, "expanded content" labels (or "ECLs") include "extended text" and "expanded copy" labels, along with so-called "booklet" labels and the like. In their simplest forms, these labels have a base ply joined to a top ply via an adhesive coupling or "hinge" between the two plies. An example of such a label is disclosed in U.S. Pat. No. 5,264,265 issued to Kaufmann, entitled "PEEL-BACK RE-SEALABLE MULTI-PLY LABEL". These labels also typically include a "release/reseal system" opposite the hinge, which allows the plies to be repeatedly opened or unsealed and resealed in booklet fashion.

Attempts have been made to provide expanded content labels for particular containers and unique uses associated therewith. For example, in U.S. Pat. No. 5,967,560 issued to Seidl entitled "HANGING LABEL", a label includes an integral suspension strap for suspending a bottle (e.g., an intravenous infusion bottle) to which the label is attached.

In U.S. Pat. No. 6,129,959 issued to Mercer, et al., entitled "SLEEVE LABEL WITH INTEGRAL FLAP AND/OR HEADER", a tubular sleeve of polymeric film is adapted for use as a sleeve label on a consumer product such as a plastic bottle or jug. The sleeve label may provide a tear-off coupon.

In U.S. Pat. No. 6,162,158 also issued to Mercer, et al., entitled "METHOD OF FABRICATING A SLEEVE LABEL WITH MULTILAYERED INTEGRAL FLAPS", a sleeve label is fabricated from a sheet of multi-folded polymeric material. Additional folding results in a multi-page booklet type label for a bottle or jug.

However, no provision has heretofore been made for simply and inexpensively labeling a tube container with an expanded content label. As used herein, "tube container" or "product tube" is intended to include all flexible tube-like product containers and pouches that may not be easily characterized by a set of standard rectangular or cylindrical profiles. Flexible tube containers typically do not have a uniform circumference, and are subject to deformation in use by squeezing to force product out therefrom. Thus, the disclosed labels cannot be satisfactorily utilized with such tubes, due to their exposure to such deformation and other attendant problems.

Therefore, there exists a need for a tube container with an integral panel for carrying a label, that may be simply and inexpensively produced.

SUMMARY OF THE INVENTION

An object of the present invention is to provide a tube container with an integral panel for carrying a label that is inexpensive and simple to produce.

In accordance with the present invention, a tube container with an integral panel for carrying a label includes a tube container having a product dispensing end, an intermediate sealing portion, and a filling end opposite the product dispensing end. The sealing portion is capable of being sealed subsequent to filling the tube container with a selected product. A label panel is provided in proximity to the sealing portion, with the label panel being integrally formed from material forming the tube container between the sealing portion and the filling end. An expanded content label is then secured to the label panel.

BRIEF DESCRIPTION OF THE DRAWINGS

FIG. 1 is an illustration of a typical tube container bearing conventional decoration.

FIG. 2 is an illustration of a top portion of an exemplary tube container in accordance with the present invention, shown immediately before introduction of a product therein.

FIG. 4 is an illustration of an alternative embodiment of a component of FIG. 2a.

FIG. 7 is an illustration of yet another alternative embodiment of the tube container with an integral panel of the present invention.

FIG. 7a is an illustration of a portion of FIG. 7, depicting a final adhered state of a label on the integral panel.

DETAILED DESCRIPTION OF THE INVENTION

Figure 2A:
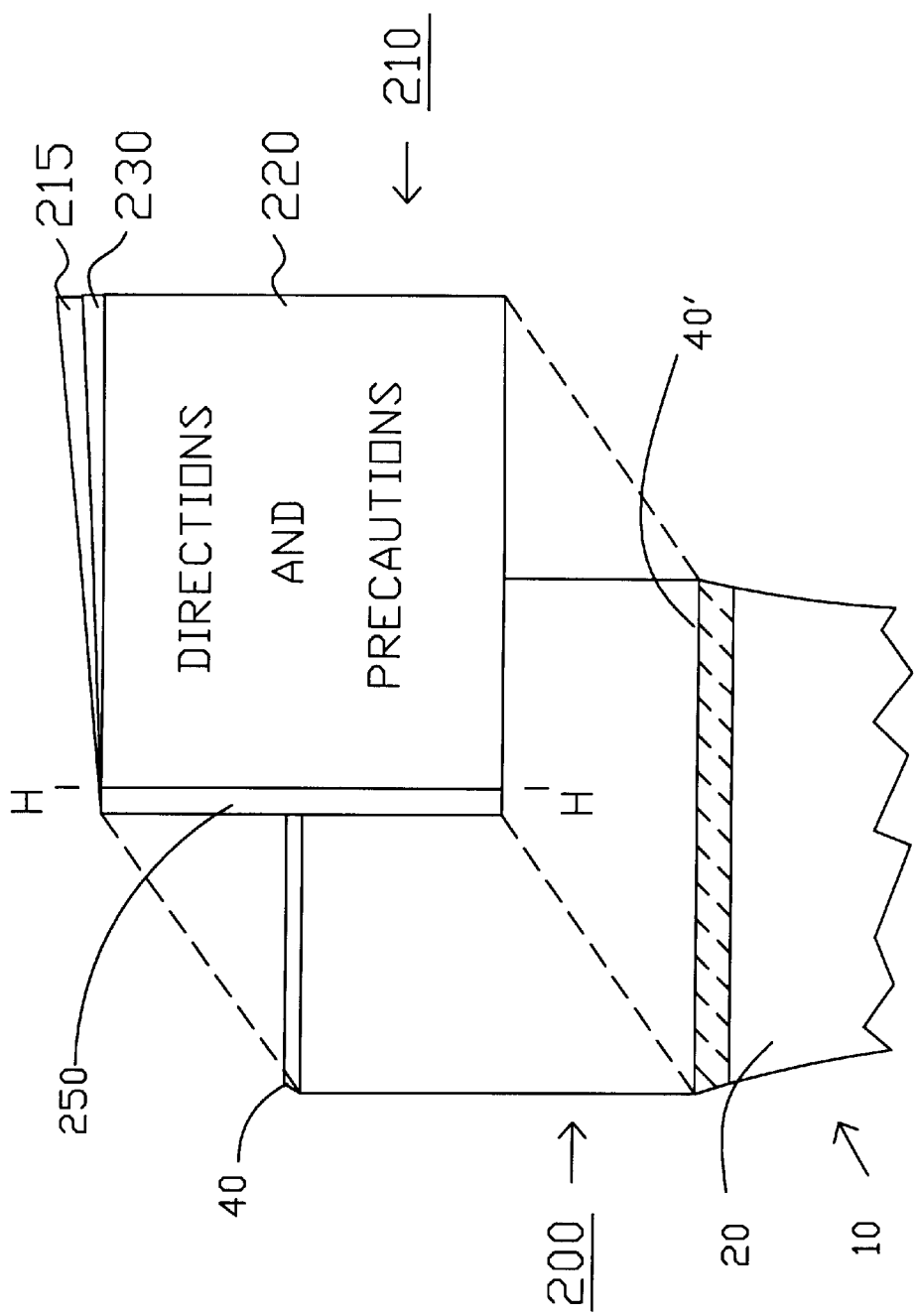
FIG. 2a is an illustration of an exemplary tube container with an integral panel for carrying a label, shown during final construction in accordance with one aspect of the present invention.

Referring to FIG. 1, there shown is a typical tube container 10 which is usually fabricated from a pliable material 20. Commonly, the fabrication is accomplished by either a so-called extrusion process, where the pliable material may be a plastic which is extruded into a tube, or by a so-called lamination process, where the pliable material may be a plastic, a foil, or any combination thereof, which is ultimately rolled into a tube.

As understood by those skilled in the packaging arts, various plastics and foils that may be utilized for material 20 may be used in various combinations with each other.

As is well known, container 10 includes a product dispensing end 30 and filling end 40 opposite dispensing end 30. Dispensing end 30 commonly includes a dispensing cap whereby a product within container 10 may be squeezed out therefrom.

Container 10 also commonly bears a product identification label or other decoration 50. Decoration 50 may be provided by way of, for example, a simple pressure-sensitive (p-s) adhesive label, or by any number of direct decorating techniques.

Although not shown in FIG. 1, in an assembly line production of a finished consumer product including container 10, a semi-liquid product is introduced thereto via filling end 40. After container 10 has been filed with the product, container 10 passes in the assembly line to a sealing station employing any suitable method for sealing container 10 at filling end 40, such as by way of so-called "crimp" and/or "seal" methods. These various sealing methods typically employ either an electric heat element/water-cooled crimping device (e.g., for plastic tubes) or an ultrasonic heat sealing and crimping device (e.g., for foil tubes). These sealing methods may be provided by any commercially available tube filling and sealing equipment, and as used herein, include any suitable method for sealing tube 10 at filling end 40.

FIG. 2 depicts tube 10 of the present invention prior to filling or introduction of a product therein. In the figure, container 10 includes material 20 and filling end 40, which is, of course, capable of being filled with a desired product. For comparison, an area of container 10 in FIG. 2 corresponding to that area which would have otherwise been sealed as in FIG. 1 (at 40) is identified as sealing portion 40'. It is to be understood that the filling of container 10 in FIG. 2 is performed such that the filled product does not extend approximately above an area of container 10 that would have been otherwise sealed (at sealing portion 40') as aforementioned.

Turning now to FIG. 2a, container 10 of FIG. 2 is depicted as having been filled and sealed. Specifically, after filling at end 40, container 10 is sealed at sealing portion 40' to form an enclosed chamber for the product. This sealing at portion 40' may be done by, for example, any of the aforedescribed sealing methods. Label panel 200 is then integrally formed in proximity to and between filling end 40 and sealing portion 40' by way of any suitable "flat ironing" or other technique for flattening out and sealing together pliable material 20. This flattening and sealing of pliable material 20 integrally creates label panel 200 from that portion of material 20 between sealing portion 40' and end 40.

Further, in FIG. 2a, an exemplary expanded content label 210 (hereinafter, "label 210") is depicted, for use with the tube container with an integral panel for carrying a label of the present invention. Label 210 includes a base ply 215 and a top ply 220, and may include any number of intermediate plies 230. Conventionally, base ply 215 and top ply 220 (along with intermediate plies 230, if any) are adhesively joined to form a "hinge" about axis H—H along longitudinal hinge portion 250. Hinge portion 250 along axis H—H facilitates opening and closing of label 210 in use, in booklet fashion.

With continued reference to FIG. 2a, label 210 is secured to panel 200 as illustrated by any one of a wide variety of adhesive or other bonding techniques; preferably, a pressure-sensitive adhesive would be utilized to bond a back surface of ply 215 to panel 200. Alternatively, label 210 may be releasably adhered to panel 200 by use of a suitable non-permanent adhesive or combination of such adhesive with a release coating, so that label 210 may be easily removed from panel 200 by a consumer in an alternative "coupon-like" fashion. Additionally, although not depicted in FIG. 2a, label 210 could be provided to wrap around panel 200, in any desired length.

Figure 3:
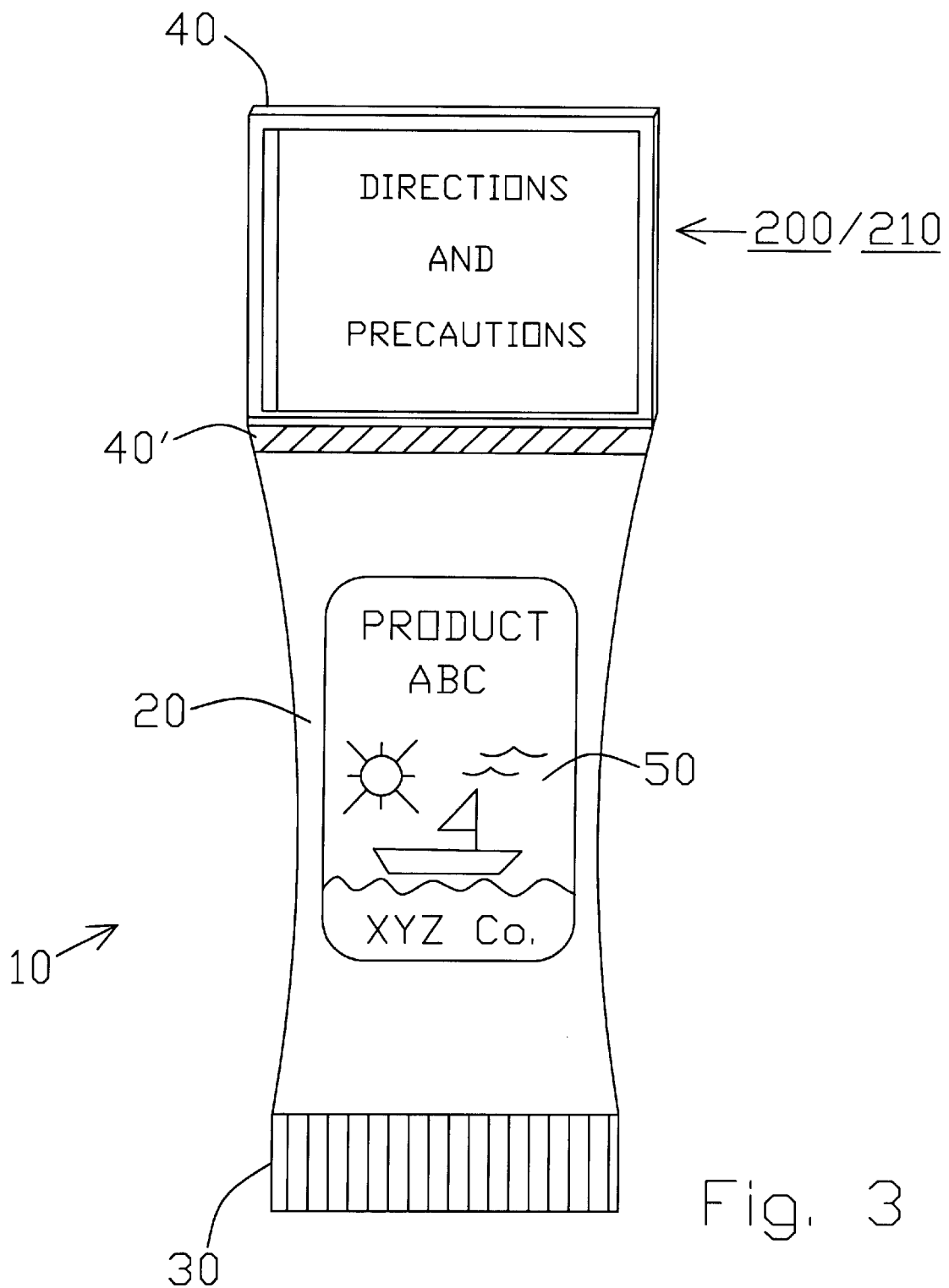
FIG. 3 is an illustration of the exemplary tube container with an integral panel for carrying a label of the present invention, as a finished product.

FIG. 3 depicts panel 200 and label 210 together with container 10, as a finished product for use by a consumer.

Figure 4:
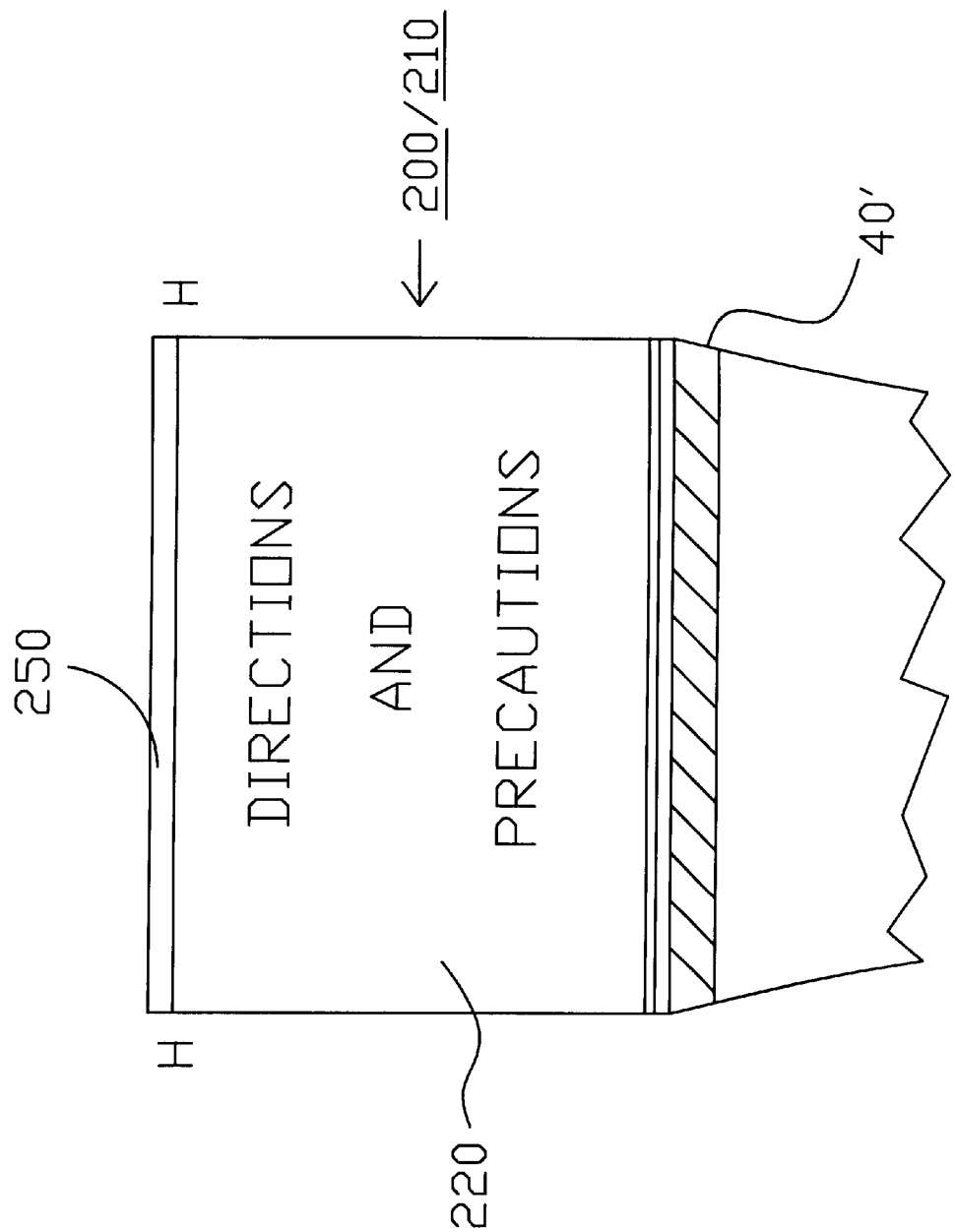

Turning now to FIG. 4, there illustrated is an alternative embodiment of label 210, in use with panel 200. Specifically in FIG. 4, hinge axis H—H is shown as being substantially parallel to sealing portion 40'. It is to be appreciated that in this configuration, label 210 may be opened in booklet fashion in a top-to-bottom sense (as contrasted by a left-to-right sense in FIGS. 2a–3). Of course, it is to be appreciated that hinge axis H—H may be provided in any desired orientation relative to portion 40', whether horizontally, diagonally, or vertically.

Figure 5:
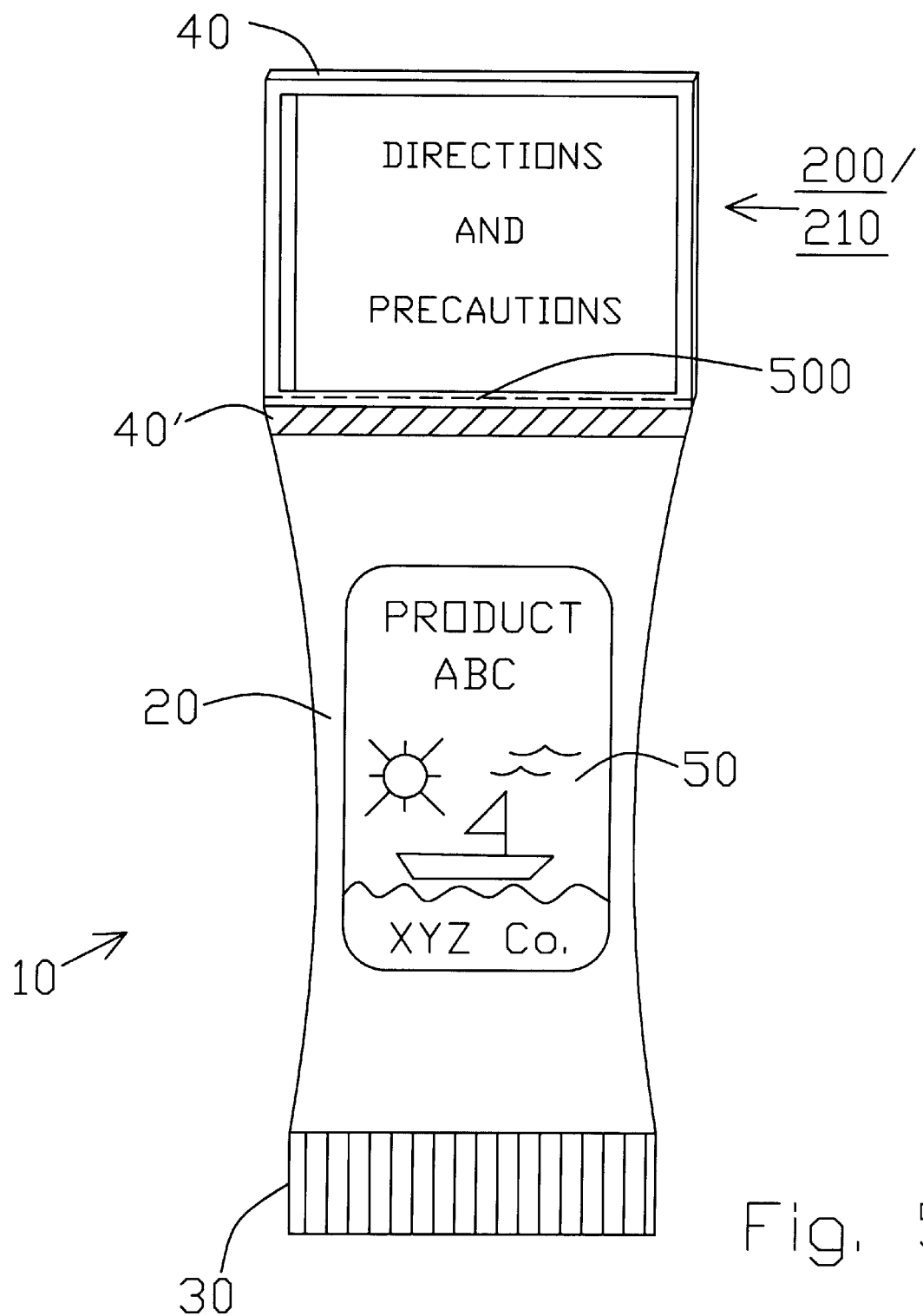
FIG. 5 is an illustration of an alternative embodiment of the tube container with an integral panel for carrying a label of the present invention.

Turning now to FIG. 5, there illustrated is another alternative embodiment constructed in accordance with the present invention. Therein, a perforated or scored tear-off portion 500 is provided between sealing portion 40' and end 40, and specifically proximate to portion 40' lengthwise there along. In this embodiment, label panel 200 may be permanently removed or torn off from container 10 as may be desired by, for example, a consumer. Provision of tear-off portion 500 is preferably achieved by way of die cut perforations made either during or after the aforedescribed flattening out and sealing together of pliable material 20. Although not illustrated, it is to be appreciated that tear-off portion 500 may be selectively provided with additional perforations or more substantial scoring, such that panel 200 is inclined to naturally "fall over" and not be vertically rigid as shown in FIG. 5. This may be advantageous where vertical height considerations are of importance, such as when container 10 is to be placed between store shelves-or presented for sale within a carton. Furthermore, this selective scoring or perforation may be provided such that panel 200 is naturally disposed to fall-over in a desired direction (e.g., "backward", so that decoration 50 is not obscured thereby).

It is to be particularly appreciated that with the arrangement of label panel 200 and label 210, a consumer's view of the basic product identification and/or decorative label 50 is not obstructed. This is of great importance in "over-the-counter" consumer products where such decorative labels are frequently utilized at great expense and effort to obtain the consumer's attention. Thus, when the present invention is employed with such a label 50, market appeal is not compromised.

Figure 6:
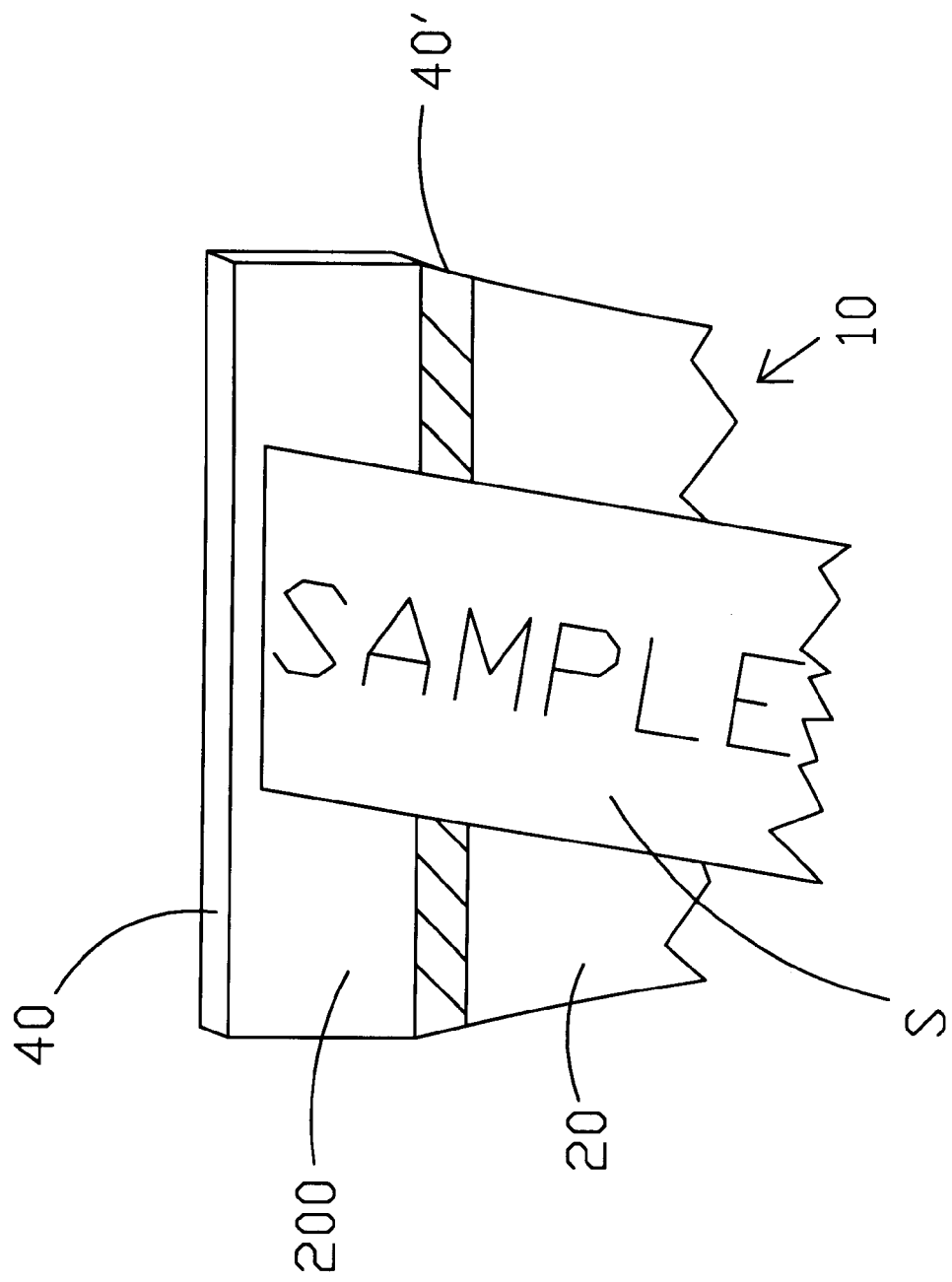
FIG. 6 is an illustration of another alternative embodiment of the tube container with an integral panel of the present invention.

With attention, now, to FIG. 6, there depicted is another alternative embodiment of the tube container with an integral panel 200 of the present invention. In FIG. 6, panel 200 is shown as being only slightly larger in area than portion 40' and also smaller relative to the exemplary panel 200 shown in FIGS. 2a-5. This embodiment of panel 200 may be advantageously utilized where, for example, it is desired to secure an additional product sample (S) to tube 10 (as, e.g., a "pillow pack"). As may be appreciated, sample S may be secured to panel 200 by any suitable means, such as by way of adhesives (e.g., permanent or non-permanent hot melt adhesives or glues, and the like) or by mechanical fasteners (e.g., staples, rivets, and the like) or even by various heat-sealing or thermoplastic techniques. Of course, any object of interest could be substituted for sample S (e.g., a label, card, or coupon) and be attached to panel 200.

Turning, finally, to FIGS. 7 and 7a, there shown is yet another alternative embodiment of the tube container with an integral panel 200 of the present invention. Therein, label 210 folds over panel 200 (FIG. 7), so that alternative language graphics may be presented on opposing sides of panel 200. As discussed above, label 210 is secured to panel 200 by any one of a wide variety of adhesive or other bonding techniques (FIG. 7a).

Although also not illustrated in the aforedescribed figures, it is to be understood, of course, that a conventional single-ply label could be readily substituted for the exemplary expanded content label discussed herein. Like the expanded content label, the single-ply label could also be removable from panel 200 in coupon-like fashion. Likewise, the single-ply label could be provided to wrap around panel 200, in any desired length.

While the present invention has been particularly shown and described with reference to the accompanying figures, it will be understood, however, that other modifications thereto are of course possible, all of which are intended to be within the true spirit and scope of the present invention. It should be appreciated that components of the invention aforedescribed may be substituted for other suitable components for achieving desired similar results, or that various accessories may be added thereto.

It is to be understood in general that any suitable alternatives may be employed to provide the tube container with an integral panel for carrying a label of the present invention. Thus, for example, the embodiments of the present invention shown in the figures and described herein may be employed in various combinations and configurations with each other.

Also, it is to be appreciated that the combination of panel 200 and label 210 in the present invention providing means for conveying additional information to a consumer, may eliminate a need for an individual "point-of-sale" printed carton for container 10, since information otherwise provided on the carton could be incorporated with panel 200 and label 210.

Additionally, it will be appreciated that any suitable single-ply or expanded content label may be substituted for the exemplary label 210 shown and described herein.

Lastly, the choice of compositions, sizes, and strengths of various aforementioned components are all a matter of design considerations depending upon intended uses of the present invention. For example, although label panel 200 and label 210 have been depicted as being no larger than container 10, they could be any desired complementary size or shape.

Accordingly, these and other various changes or modifications in form and detail of the present invention may also be made therein, again without departing from the true spirit and scope of the invention as defined by the appended claims.

What is claimed is:

1. A tube container with an integral panel for carrying a label, wherein a tube container includes a product dispensing end, an intermediate sealing portion, and a filling end opposite the product dispensing end, the sealing portion being sealed subsequent to filling the tube container with a selected product, said tube container with an integral panel for carrying a label comprising:
   a label panel in proximity to the sealing portion,
      said label panel being integrally formed from material forming the tube container between the sealing portion and the filling end; and
   an expanded content label secured to said label panel.

2. The tube container with an integral panel for carrying a label of claim 1, wherein said label panel further includes a tear-off portion provided proximate to the sealing portion, for permanently removing said label panel from said tube container.

3. The tube container with an integral panel for carrying a label of claim 1, wherein said expanded content label is releasably adhered to said label panel for removal from said label panel, in coupon-like fashion.

4. The tube container with an integral panel for carrying a label of claim 2, wherein said expanded content label is releasably adhered to said label panel for removal from said label panel, in coupon-like fashion.

5. The tube container with an integral panel for carrying a label of claim 1, wherein a single-ply label is substituted for said expanded content label.

6. The tube container with an integral panel for carrying a label of claim 5, wherein said label panel further includes a tear-off portion provided proximate to the sealing portion, for permanently removing said label panel from said tube container.

7. The tube container with an integral panel for carrying a label of claim 5, wherein said single-ply label is releasably adhered to said label panel for removal from said label panel, in coupon-like fashion.

8. The tube container with an integral panel for carrying a label of claim 6, wherein said single-ply label is releasably adhered to said label panel for removal from said label panel, in coupon-like fashion.

9. The tube container with an integral panel for carrying a label of claim 1, wherein a wrap-around label is substituted for said expanded content label.

10. The tube container with an integral panel for carrying a label of claim 9, wherein said label panel further includes a tear-off portion provided proximate to the sealing portion, for permanently removing said label panel from said tube container.

11. The tube container with an integral panel for carrying a label of claim 9, wherein said wrap-around label is releasably adhered to said label panel for removal from said label panel, in coupon-like fashion.

12. The tube container with an integral panel for carrying a label of claim 10, wherein said wrap-around label is releasably adhered to said label panel for removal from said label panel, in coupon-like fashion.

13. A tube container with an integral panel, wherein a tube container includes a product dispensing end, an intermediate sealing portion, and a filling end opposite the product dispensing end, the sealing portion being sealed subsequent to filling the tube container with a selected product, said tube container with an integral panel comprising a panel in proximity to the sealing portion, said panel being integrally formed from material forming the tube container between the sealing portion and the filling end, wherein said panel is utilized to secure an object of interest to the tube container.

14. The tube container with an integral panel of claim 13, wherein said label panel further includes a tear-off portion provided proximate to the sealing portion, for permanently removing said label panel from said tube container.

* * * * *